United States Patent [19]

Fox

[11] 4,028,335

[45] June 7, 1977

[54] THERMALLY STABLE FLAME-RETARDANT THERMOPLASTIC MOLDING COMPOSITION

[75] Inventor: Daniel Wayne Fox, Pittsfield, Mass.

[73] Assignee: General Electric Company, Pittsfield, Mass.

[22] Filed: Aug. 23, 1976

[21] Appl. No.: 716,882

Related U.S. Application Data

[63] Continuation-in-part of Ser. No. 527,167, Nov. 25, 1974, abandoned.

[52] U.S. Cl. .................. 260/45.75 B; 260/45.7 R; 260/45.95 G
[51] Int. Cl.² .......................................... C08K 5/59
[58] Field of Search ............ 260/45.75 B, 45.7 R, 260/45.95 G

[56] References Cited

UNITED STATES PATENTS

| | | | |
|---|---|---|---|
| 3,347,822 | 10/1967 | Jenkner | 260/45.7 |
| 3,382,207 | 5/1968 | Jaquiss | 260/45.7 |
| 3,493,536 | 2/1970 | Weisfeld | 260/45.75 B |
| 3,624,024 | 11/1971 | Caldwell et al. | 260/45.7 |
| 3,686,362 | 8/1972 | Hinckley et al. | 260/45.7 |

*Primary Examiner*—V. P. Hoke
*Attorney, Agent, or Firm*—Donald M. Papuga; William F. Mufatti

[57] ABSTRACT

A thermally stable flame-retardant thermoplastic molding composition comprising in admixture, a styrenic polymer, at least 1.0 weight percent of a polyhalodiphenyl carbonate containing 6–10 halogen atoms and at least 0.5 weight percent of antimony trioxide.

4 Claims, No Drawings

THERMALLY STABLE FLAME-RETARDANT THERMOPLASTIC MOLDING COMPOSITION

This application is a continuation-in-part application of Ser. No. 527,167, filed Nov. 25, 1974, and now abandoned.

This invention relates to a thermally stable flame-retardant thermoplastic molding composition comprising in admixture, a styrenic polymer, at least 1.0 weight percent of a polyhalodiphenyl carbonate containing 6–10 halogen atoms and at least 0.5 weight percent of antimony trioxide. The halogen atoms of the polyhalodiphenyl carbonate may be chlorine or bromine or mixtures thereof.

BACKGROUND OF THE INVENTION

With recent rapid development of industry, organic synthetic high polymers have become applied to many uses, such as decorations, building materials, daily necessaries, constructions, buildings and heat-insulating materials in industry. Polystyrene is excellent in transparency, electric properties and thermoplasticity, and hence has often and much been used in the above-mentioned various fields.

Styrenic based polymers are prone to depolymerization when heated to elevated temperatures. The styrene monomer vapor, like most monomer vapors, is highly flammable. Consequently, great care must be exercised in the utilization of styrenic based polymers in applications such as electrical appliances, automotive components, electronic instruments, etc. since these components are frequently exposed to high temperatures and ignition sources.

Television cabinets are a case in point. As a consequence of the fire hazard, regulatory agencies have established flammability standards on the components of television sets which are scheduled to increase in rigidity over a several year period of time. Ordinary styrenic polymers possess the requisite physical and electrical properties but cannot meet flammability requirements.

There is a need for additives which can be combined with styrenic polymers to reduce their inherent flammability. These additives must not, however, compromise the other desirable properties of the polymers.

Typical fire retardant additives which have been used for polymers include halogenated aliphatic hydrocarbons, such as 1,1,2,2-tetrabromoethane, 1,2,3,4-tetrachloroethane, 1,2-dibromoethane (Japanese patent publication No. 5,739/62), 2-chloro-1,2,-3,4-tetrabromobutane (Japanese patent publication No. 20,216/66), chlorinated parrafin wax and the like, haloalkyl phosphates, such as tris-(2,3-dibromopropyl) phosphate (Japanese patent publication No. 6,788/58) and the like and acetals or ethers of 2,3-dibromopropanol-1 (Japanese patent publication No. 7,089/60) are known as flame-retarding agents for polystyrene.

Chlorinated and brominated aromatic compounds have tended to be more efficient flame retardants for styrenic polymers than have the halogenated aliphatics. Thus, because of increased compatibility and decreased volatility, hexabromobenzene, the brominated and chlorinated diphenyls and completely halogenated decabromodiphenyl ether or decachlorodiphenyl ether have been used extensively. This is illustrated by U.S. Pat. Nos. 2,022,634; 2,188,903; 3,072,728; 3,347,822 and 3,728,304. As with most halogenated compounds, and particularly in the use of aromatics, there has been considerable concern over the persistence and possible toxicological effects. Also, these additives tend to cause yellowing of the polymer on exposure to light.

German Published Application DAS 1,201,544 describes flameproof molding compositions which have been rendered flameproof by the addition of 25–40% by weight of chlorinated hexamethylbenzenes, based on the polymer composition, in mixture with oxygen compounds or sulfur compounds of an element of Main Group V of the Periodic Table. However, additives of this order of magnitude have a detrimental effect on the mechanical properties of the basic polymers.

Materials which have been found most generally effective for styrenic polymers include polyhalogenated benzene, diphenyl and diphenyl ethers. These products, frequently in conjunction with metallic based co-catalysts, are generally functionally effective but are not completely satisfactory for various reasons. Some of the disadvantages of these materials include toxicity and environmental persistance. Thus, polychlorinated diphenyl and assorted brominated diphenyls build up in the liver and fatty tissue of animals with chronic physiological ill effects. Some of these materials have sufficient volatility that they tend to evaporate from the surface of molten plastic as it enters the mold. The vapor condenses on the surface of the mold and/or accumulates at the vents of the mold. This phenomenon is known as plate-out and manifests itself in one of two ways. If the vents become clogged, the part may actually burn as a consequence of compressing air and flammable vapors into an unvented mold. The high compression raises the temperature of the gases to the combustion point. The other and more common effect of plate-out is poor surface on molded objects since the plated out additive powder is pressed on to the surface of the part.

Frequent interruptions of the molding process required to physically wipe the molds free of plate-out.

Other deficiencies include incompatibility and volatility or decomposition temperatures which differ too much from the base polymer.

Another key deficiency of halogenated aromatic compounds, especially halogenated aromatic ethers, is the tendency to turn yellow when exposed to light. This is particularly bothersome in appearance parts where style is of great importance. A white or pastel colored appliance can turn yellow to brown after a short exposure to direct sunlight. Fluorescent lights, indirect lighting or incandescent lighting merely takes a little longer to discolor conventionally flame retarded styrenic plastics.

I have found that many of the deficiencies of currently available flame retardant systems may be alleviated by utilization of a combination of polyhalogenated diaryl carbonates and antimony oxide. The polyhalogenated diaryl carbonates were found to be useful fire retardants when used alone with certain high ignition temperature polymers (U.S. Pat. No. 3,382,207). However, these materials are ineffective when used alone with styrenic polymers. The explanation probably lies in the great difference in decomposition temperatures between the styrenic polymers and those of U.S. Pat. No. 3,382,207.

I have found that antimony oxide makes the difference and presume that its effect may be due to its ability to cause early (lower temperature) thermal cracking of the polyhalodiaryl carbonates.

Using this combination, I have found that volatilities are sufficiently low that plate-out is eliminated at styrenic polymer molding temperatures. The diaryl carbonates are biodegradable and do not persist as permanent residues. The appropriate flammability may be obtained. And finally, compositions containing my system yellow to a far less degree than the current standard of the industry.

DESCRIPTION OF THE INVENTION

It has been discovered that a thermoplastic molding composition comprising in admixture, a styrenic polymer, at least 1.0 weight percent of a polyhalodiphenyl carbonate containing 6–10 halogen atoms and at least 0.5 weight percent of antimony trioxide is flame retardant. The polyhalodiphenyl carbonate and antimony trioxide render the styrenic polymer flame retardant with significantly lower yellowing of the compound on light exposure than is the case when other halogenated aromatic compounds are used. Also, the polyhalodiphenyl carbonate and antimony trioxide do not significantly affect the properties of the styrenic polymer as do many of the prior art additives. Moreover, the processability of the styrenic polymer from the standpoint of melt stability or flow at normal processing conditions is not affected by the polyhalodiphenyl carbonate and antimony trioxide additives.

The styrenic polymers used in the present invention include polystyrene, poly-α-methylstyrene and copolymers containing styrene or α-methylstyrene which are copolymerized with at least 50 percent of styrene or α-methylstyrene. As copolymer components, acrylonitrile, butadiene, and esters of acrylic and methacrylic acid may be used.

Representative examples of styrenic polymers which may be rendered flame retardant according to the teachings of this invention include polystyrene, poly-α-methylstyrene, polybutylstyrene, copolymers of these, impact modified polystyrene containing co-reacted or blended elastomers, styrene acrylonitrile polymers, acrylonitrile-butadiene styrene (ABS) polymers, copolymers of styrene with acrylic and methacrylic acids and esters, maleic anhydride or ester copolymers with styrene, etc.

The preparation of styrene polymers is disclosed in the Kirk-Othmer "Encyclopedia of Chemical Technology," Vol. 13 (1954), pages 146–179, under the section "Styrene Resins and Plastics".

The polyhalodiphenyl carbonates which can be employed in the practice of this invention are those which contain 6–10 halogens, where the halogens are bromine or chlorine or mixtures thereof. These polyhalodiphenyl carbonates are fully described in U.S. Pat. No. 3,382,207 which is incorporated herein by reference. The polyhalodiphenyl carbonates which may be employed in this invention include hexabromodiphenyl carbonate, decabromodiphenyl carbonate, hexachlorodiphenyl carbonate, decachlorodiphenyl and mixtures thereof. The preferred polyhalodiphenyl carbonate is decabromodiphenyl carbonate. Also, the polyhalodiphenyl carbonates produced by the phosgenation of halogenated phenols. The polyhalodiphenyl carbonate may be used in amounts of at least 1.0 weight percent. Preferred amounts being from about 1.0 to about 20 weight percent, said weight percent being based on the weight of the styrenic polymer.

The composition of the instant invention contains antimony trioxide in amounts of at least 0.5 weight percent. Preferably, the amounts of antimony trioxide employed in the instant invention is from about 0.5 weight percent to about 10.0 weight percent, said weight percent being based on the weight of the styrenic polymer.

It should be understood that the degree of flame retardance increases with increasing polyhalodiphenyl carbonate content. The antimony trioxide is a coreactant with the halogenated compound and should be present in amounts of one-third to one-half of the halogenated compounds.

The thermoplastic molding composition can contain, in addition to the polyhalodiphenyl carbonate and antimony trioxide, other customary additives, e.g., stabilizers, lubricants, fillers, plasticizers, coloring agents, etc.

DESCRIPTION OF THE PREFERRED EMBODIMENT

The following examples are set forth to illustrate more clearly the principle and practice of this invention to those skilled in the art. Unless otherwise expressed, where parts are mentioned, they are parts by weight.

EXAMPLE I

One hundred parts of high impact polystyrene are injection molded into test bars which are 0.090 × 0.500 × 5 inches. These bars are subjected to the following tests: Underwriters Laboratories Subject 94 flame test; Oxygen Index ASTM D2683-70; Heat Deflection temperature, ASTM D648; and Izod impact, ASTM D256. The results are given in TABLE I.

EXAMPLE II

One hundred parts of high impact polystyrene, 12.3 parts of decabromodiphenyl carbonate and 5.0 parts of antimony trioxide were compounded on a 1 inch Wayne extruder and the extrudate is comminuted into pellets. The pellets are injection molded into the test bars and the test bars subjected to the tests are set forth in Example I. The results are given in TABLE I.

EXAMPLE III

Example II is repeated with the exception that decabromodiphenyl ether was substituted for the decabromodiphenyl carbonate, the current standard in industry. The results are given in TABLE I.

TABLE I

| SAMPLE | U.L. 94 | OXYGEN INDEX | HEAT DEFLECTION TEMPERATURE °F | IZOD IMPACT |
|---|---|---|---|---|
| I | Burns | 17.8 | 182 | 3.0 |
| II | 94V-O | 24.2 | 171 | 1.4 |
| III | 94V-O | 24.8 | 170 | 1.4 |

As can be seen from TABLE I, the use of the polyhalodiphenyl carbonate with the antimony trioxide, in accordance with the instant invention, results in a composition which is rendered non-burning and still retains acceptable properties of heat deflection temperatures, izod impact as compared with using no flame retardant additive and the additive of the prior art.

EXAMPLE IV

A. One hundred parts of high impact polystyrene, 12.0 parts of decabromodiphenyl ether, which contains 10 parts of bromine based on the polystyrene, and 5.0 parts of antimony trioxide were compounded on a 1 inch Wayne extruder and the extrudate comminuted into pellets.

B. (A) is repeated except that 12.3 parts of decabromodiphenyl carbonate, which contains 10 parts of bromine based on the polystyrene, is employed in place of the decabromodiphenyl ether.

C. (A) is repeated except that 8.9 parts of decabromodiphenyl ether, which contains 7.4 parts of bromine, and 3.3 parts of antimony oxide are employed in place of 12.0 parts of decabromodiphenyl ether and 5.0 parts of antimony trioxide, respectively.

D. (B) is repeated except that 9.12 parts of decabromodiphenyl carbonate, which contains 7.4 parts of bromine, and 3.3 parts of antimony oxide are employed in place of 12.3 parts of decabromodiphenyl carbonate and 5.0 parts of antimony trioxide, respectively.

Each of the polymer compositions of (A) through (D) are injection molded into standard test specimens. The Yellowness Index of these samples as molded is measured in accordance with ASTM Yellowness Index Test D1925. The samples are then exposed to ultraviolet light in an Atlas fadeometer. Yellowness Index (YI) is measured at intervals of 8, 24 and 100 hours of exposure. The results are set forth in TABLE II. $\Delta$YI represents the difference between the YI after exposure and the YI as molded.

TABLE II

| Sample | YI as Molded | YI After Exposure (Hrs.) | | | $\Delta$YI | | |
|---|---|---|---|---|---|---|---|
| | | 8 | 24 | 100 | 8 | 24 | 100 |
| A | 12.95 | 40.87 | 53.39 | 75.69 | 27.92 | 40.44 | 62.74 |
| B | 11.77 | 14.36 | 19.99 | 32.14 | 2.59 | 8.22 | 20.37 |
| C | 12.64 | 38.28 | 59.16 | 75.62 | 25.64 | 46.52 | 62.98 |
| D | 11.86 | 14.19 | 23.69 | 35.88 | 2.33 | 11.83 | 24.02 |

The data in TABLE II shows that the samples containing decabromodiphenyl carbonate (Samples B and D) have a lower $\Delta$Y1 than samples containing decabromodiphenyl ether. A lower $\Delta$YI indicates lower discoloration.

It will thus be seen that the objects set forth above, among those made apparent from the preceding description, are efficiently attained and, since certain changes may be made in carrying out the above process and in the composition set forth without departing from the scope of the invention, it is intended that all matters contained in the above description shall be interpreted as illustrative and not in a limiting sense.

What is claimed is:

1. A thermally stable flame-retardant thermoplastic molding composition comprising in admixture, a styrenic polymer, from 1.0 to about 20 weight percent of a polyhalodiphenyl carbonate containing 6–10 halogen atoms and from 0.5 to about 10.0 weight percent of antimony trioxide; said weight percent being based on the weight of styrenic polymer; said halogen atoms being selected from the group consisting of bromine or chlorine or mixtures thereof.

2. The composition of claim 1, wherein the styrenic polymer is selected from the group consisting of polystyrene, poly-$\alpha$-methylstyrene, mixed polymers containing at least 50 percent styrene and mixed polymers containing at least 50 percent $\alpha$-methylstyrene.

3. The composition of claim 1 wherein the polyhalodiphenyl carbonate is decabromodiphenyl carbonate.

4. The composition of claim 1 wherein the polyhalodiphenyl carbonate is decachlorodiphenyl carbonate.

* * * * *